United States Patent
Andersen

(10) Patent No.: US 7,831,758 B2
(45) Date of Patent: Nov. 9, 2010

(54) ACCELERATING INPUT/OUTPUT (IO) THROUGHPUT ON SOLID-STATE MEMORY-BASED MASS STORAGE DEVICE

(75) Inventor: David B. Andersen, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 137 days.

(21) Appl. No.: 12/004,821

(22) Filed: Dec. 21, 2007

(65) Prior Publication Data
US 2009/0164693 A1 Jun. 25, 2009

(51) Int. Cl.
G06F 13/20 (2006.01)
G06F 13/12 (2006.01)
G06F 13/36 (2006.01)

(52) U.S. Cl. .......................... 710/313; 710/62; 710/306
(58) Field of Classification Search ..................... 710/62
See application file for complete search history.

(56) References Cited

U.S. PATENT DOCUMENTS

| | | | | |
|---|---|---|---|---|
| 5,261,068 | A * | 11/1993 | Gaskins et al. | 711/157 |
| 5,497,355 | A * | 3/1996 | Mills et al. | 365/230.08 |
| 5,875,477 | A * | 2/1999 | Hasbun et al. | 711/162 |
| 6,801,971 | B1 * | 10/2004 | Devine et al. | 710/107 |
| 7,130,229 | B2 * | 10/2006 | Dahlen et al. | 365/200 |
| 2002/0144044 | A1 * | 10/2002 | Moon et al. | 710/302 |
| 2004/0206981 | A1 * | 10/2004 | Gross et al. | 257/199 |
| 2007/0061502 | A1 * | 3/2007 | Lasser et al. | 711/103 |
| 2007/0180203 | A1 * | 8/2007 | Ramgarajan et al. | 711/157 |
| 2008/0008456 | A1 * | 1/2008 | Buttars et al. | 386/125 |
| 2008/0034149 | A1 * | 2/2008 | Sheen | 711/100 |

OTHER PUBLICATIONS

Ritek Corporation, "Ritek's new USB drive Yego is hot at CeBIT show," Mar. 18, 2007, http://www.ritek.com/p3a.asp?num=175.*
Anandtech, "USB Flash Drive Roundup," Oct. 4, 2005, pp. 1-4, http://www.anandtech.com/memory/showdoc.aspx?i=2549&p=3.*
Everything USB, "USB 2.0, Hi-Speed USB FAQ," Aug. 31, 2006, pp. 1-5, http://www.everythingusb.com/usb2/faq.htm.*
Infineon Technologies, "Intel Dual-Channel DDR Memory Architecture White Paper," Rev. 1.0, Sep. 2003, Infineon Technologies North America Corporation and Kingston Technology Company, Inc., pp. 1-14.*
Everything USB, "Pretec's Flash Drive Doubles as USB Hub," Mar. 9, 2006 http://www.everythingusb.com/pretec_idisk_connect_1gb.html.*
Everything USB, "Corsair Flash Survivor GT 8GB Flash Drive Review," Jun. 20, 2007, pp 1-7, http://www.everythingusb.com/corsair_flash_survivor_gt_8gb_12805.html.*

(Continued)

Primary Examiner—Tariq Hafiz
Assistant Examiner—Dayton Lewis-Taylor
(74) Attorney, Agent, or Firm—Trop, Pruner & Hu, P.C.

(57) ABSTRACT

In one embodiment, a portable mass storage device may include a bus hub having a first port to couple to a bus and other ports to connect to multiple multi-channel memory controllers, where each memory controller is coupled to multiple non-volatile storage arrays, and the memory controllers can independently service the arrays to enable overlapping data transfer operations. Other embodiments are described and claimed.

15 Claims, 1 Drawing Sheet

OTHER PUBLICATIONS

Patriot Memory, "Patriot Memory Unveils the World's Fastest Memory Module and USB Flash Drive at CES 2007," Dec. 27, 2006. http://www.patriotmem.com/company/news/newsp.jsp?source=63.*

Intel, "Benefits of Intel® Matrix Storage Technology—White Paper," Dec. 2005, pp. 1-17.

Big Bruin Tech News and Reviews, "The Thumb Drive RAID Experiment," Dec. 30, 2005, pp. 1-8, http://www.bigbruin.com/review05/thumbraid_1.

* cited by examiner

ACCELERATING INPUT/OUTPUT (IO) THROUGHPUT ON SOLID-STATE MEMORY-BASED MASS STORAGE DEVICE

BACKGROUND

Currently the most prevalent instance of refillable storage devices are flash drives, also commonly referred to as universal serial bus (USB) thumb drives. Other similar USB-connected, solid state memory-based, mass storage devices are in common usage.

Today, flash drives are readily available in multi-gigabyte (GB) capacities. This opens the possibility of using these devices to store and transport very large files such as full length, high-definition movies. Using a modern video coding scheme such as motion picture experts group (MPEG) version 4.10, a 2 hour high definition (e.g., a 720 line progressive scan (720 P)) movie would require approximately 6 GB of storage. Even though flash drives now have very large capacities, the time it takes to transfer a 6 GB file is quite long. Typical write speeds for devices today range from 5 megabytes per second (MB/sec) to 20 MB/sec, with most closer to 5 MB/sec. Thus it could take up to 20 minutes to transfer a single high definition movie file to a typical flash drive.

DETAILED DESCRIPTION

Embodiments may be used to read/write data from/to a solid-state memory-based USB-connected mass storage device more rapidly than is currently possible. In this way, consumers may acquire, easily transport and consume video or other large sized content using a compact, refillable storage device. Embodiments use an architecture and system partitioning to potentially double the I/O performance of flash drives. In some instances the limiting factor on I/O performance will shift from the performance of the flash memory array to that of the USB bus itself.

Figure 1:
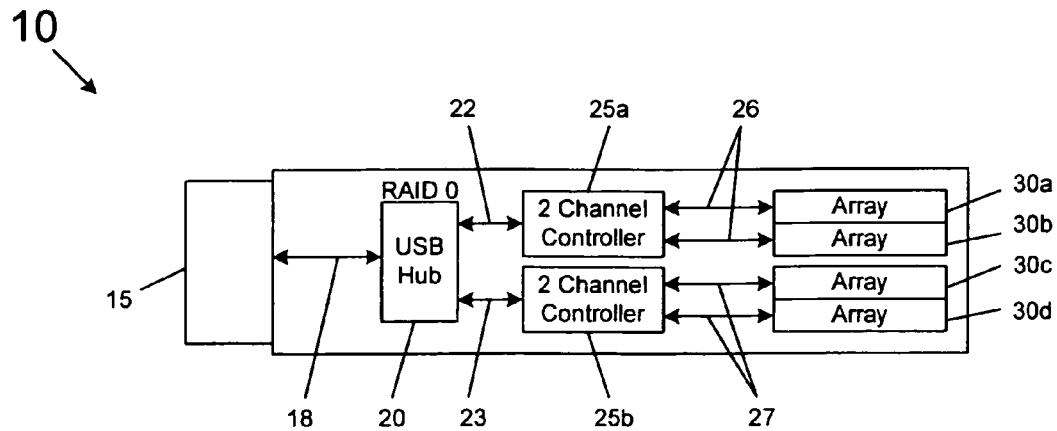
FIG. 1 is a block diagram of a storage device in accordance with an embodiment of the present invention.

Referring now to FIG. 1, shown is a block diagram of a storage device in accordance with an embodiment of the present invention. As shown in FIG. 1, storage device 10 may correspond to a portable non-volatile storage device such as a USB thumb drive, although the scope of the present invention is not limited in this regard. Storage device 10 may be coupled to a computer system (not shown in FIG. 1) using an interface 15, which may be a USB connector extending from the housing of storage device 10. All other components shown in FIG. 1 may be adapted on a single semiconductor die, in some implementations.

As shown in the embodiment of FIG. 1, storage device 10 may include a USB hub 20 which may implement a so-called redundant array of inexpensive or independent disks (RAID) level 0 functionality, which can aggregate individual storage arrays of the device into what appears to be a single storage element with higher throughput than would otherwise be available. Hub 20 may be coupled to connector 15 by an interconnect 18, which may be coupled to a first port of hub 20. In turn, two additional ports of hub 20 may be coupled to interconnects 22 and 23, which in turn are coupled to each of two different two channel memory controllers 25a and 25b (generically controller 25).

Each controller 25 may be a dual-channel memory controller such as a flash controller to service two independent non-volatile memory arrays, allowing I/O operations to be overlapped. Thus as further shown, each controller 25 is coupled through a set of interconnects 26 and 27 to multiple storage arrays 30a-30d (generically storage array 30). These arrays may be independent flash memory arrays. To effect high speed data transfer, each controller 25 may enable overlapping I/O operations to each of its corresponding arrays 30a and 30b or 30c and 30d. In one example implementation, storage arrays 30a and 30c may be used for even address locations and storage arrays 30b and 30d may be used for odd address locations such that together, each pair of arrays forms a single, continuous storage array. In other words, using a RAID 0 technique, data from USB hub 20 to dual controllers 25 are divided into stripes and written across arrays 30, enabling high I/O performance at a low cost. Of course, in other implementations, additional dual controllers, each coupled to multiple arrays may be present. Furthermore, different RAID implementations may be used in other embodiments.

While the scope of the present invention is not limited in this regard, each storage array 30 may be implemented as a flash memory array, for example, a single level cell (SLC) flash-based memory. In embodiments using SLC flash technology, the combined throughput of the memory arrays would be close to the maximum practical (as opposed to theoretical) throughput of the USB bus. However, in other implementations a multiple level cell (MLC) flash architecture or other such non-volatile storage may be used. Thus hub 20 included within storage device 10 divides the available USB bandwidth between two independent, dual-channel flash controllers, with each controller accessing 2 independent storage arrays 30.

In another implementation approach, the RAID level 0 functionality may be implemented on a host computer to which the device is coupled. In this scenario, it would appear to the host computer that 2 USB mass storage devices (i.e., corresponding to the 2 controllers) are attached to the USB bus. Driver level software in the host computer can implement the RAID functionality such that application software would see a single storage unit with much higher I/O throughput than would otherwise be available.

Thus using embodiments of the present invention, improved I/O speeds may be achieved with minimal additional complexity or increase in bill of materials for the resulting storage devices. In embodiments used in connection with a USB bus, I/O speeds for data transfer to and from the portable storage device may realize close to the full I/O capability of the USB bus, which is presently approximately 40 MB/sec. In contrast as described above, today's highest speed drive products generally do not reach even 20 MB/sec for data transfer. In this way, portable memory devices in accordance with an embodiment of the present invention may be used to power new modes of data transfer. For example, portable thumb drives may be used to store movies such that a new distribution model for movie rentals may be adapted. For example, a retailer may have a library of high definition video content, from which a user may select a title, which can then be directly written onto a portable thumb device at high speeds while retaining the high definition content. For example, a 6 GB movie may be downloaded to a thumb drive in accordance with an embodiment of the present invention in under approximately 3 minutes, greatly improving on the currently available downloading speeds. After consuming the content, the user can select another title, which can overwrite the original title.

Figure 2:
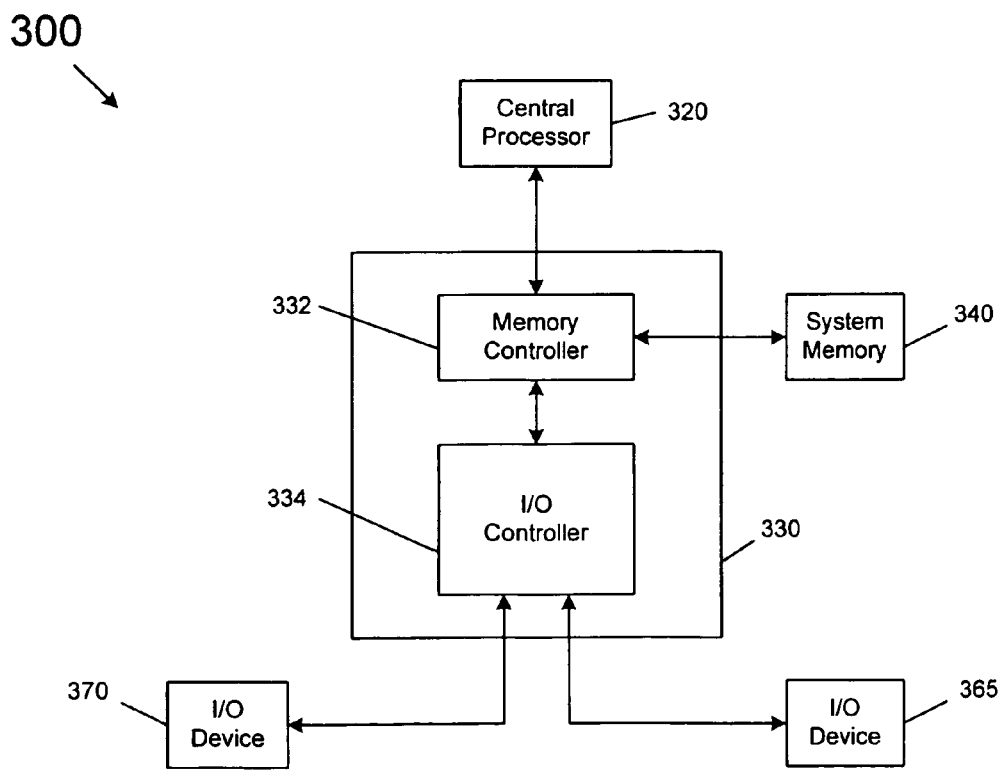
FIG. 2 is a block diagram of a computer system which may be used with embodiments of the present invention.

FIG. 2 is a block diagram of a computer system which may be used with embodiments of the present invention. The computer system 300 includes a central processor 320 that is coupled to a chipset 330, which in turn is coupled to a system memory 340. In one embodiment, a system memory controller 332 of chipset 330 couples central processor 320 to system memory 340. In another embodiment, a system memory controller is located on the same chip as central processor 320. Information, instructions, and other data may be stored in system memory 340 for use by central processor 320 as well as many other potential devices.

Input/output (I/O) devices, such as I/O devices 365 and 370, are coupled to an I/O controller 334 of chipset 330 through one or more I/O interconnects. In one embodiment, interconnect 360 may be Peripheral Component Interconnect (PCI) interconnect, and I/O device 365 is a serial advanced technology attachment (SATA) device such as a hard drive or other mass storage. The interconnect to I/O device 370 may be a USB bus and I/O device 370 may be a thumb drive in accordance with an embodiment of the present invention. In this way, high definition video content stored on drive 365 may be downloaded to thumb device 370 (or vice versa) at or substantially at the speed of the USB bus.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   a universal serial bus (USB) hub having a first port to couple to a USB bus and second and third ports;
   a first dual channel memory controller coupled to the second port of the USB hub;
   a first pair of non-volatile storage arrays coupled to the first dual channel memory controller, wherein the first dual channel memory controller is operable to independently service the first non-volatile storage array and the second non-volatile storage array to enable overlapping data transfer operations therewith;
   a second dual channel memory controller coupled to the third port of the USB hub; and
   a second pair of non-volatile storage arrays coupled to the second dual channel memory controller, wherein the second dual channel memory controller is operable to independently service the third non-volatile storage array and the fourth non-volatile storage array to enable overlapping data transfer operations therewith;
   wherein (a) the USB hub, the first and second dual channel controllers and the first through fourth non-volatile storage arrays are adapted on a single semiconductor die, and (b) the first dual channel memory controller is operable to address even data locations to the first non-volatile storage array and address odd data locations to the second non-volatile storage array, and the second dual channel memory controller is operable to address even data locations to the third non-volatile storage array and address odd data locations to the fourth non-volatile storage array.

2. The apparatus of claim 1, wherein the USB hub is operable to implement a redundant array of inexpensive or independent disks (RAID) functionality so that the first through fourth non-volatile storage arrays appear as a single storage element.

3. The apparatus of claim 2, wherein the RAID functionality comprises a RAID level 0 system to aggregate the first through fourth non-volatile storage arrays.

4. The apparatus of claim 2, wherein the hub is operable to divide available bandwidth of the bus between the first and second controllers.

5. The apparatus of claim 1, wherein the apparatus comprises a portable non-volatile storage device configured to be coupled to a host computer to enable data transfer at or substantially close to a maximum data transfer rate of the USB bus.

6. The apparatus of claim 1, wherein each of the non-volatile storage arrays comprise a flash memory array having a single level cell (SLC) architecture.

7. The apparatus of claim 1, wherein the apparatus comprises a portable non-volatile storage device configured to be coupled to a host computer to enable data writing to the portable non-volatile storage device generally at a maximum practical data transfer rate of the USB bus.

8. The apparatus of claim 1, wherein the apparatus comprises a portable non-volatile storage device configured to receive 6 GB of data in less than approximately 3 minutes.

9. A method comprising:
   receiving data from a host system at a universal serial bus (USB) hub of a portable mass storage device connected to a USB port of the host system;
   forwarding the data in a striped manner to a first multi-channel memory controller and a second multi-channel memory controller;
   transferring the data received in the first multi-channel memory controller to a first non-volatile storage array and a second non-volatile storage array in an overlapping manner; and
   transferring the data received in the second multi-channel memory controller to a third non-volatile storage array and a fourth non-volatile storage array in an overlapping manner; and
   addressing even data locations to the first non-volatile storage array and addressing odd data locations to the second non-volatile storage array using the first multi-channel memory controller, and addressing even data locations to the third non-volatile storage array and addressing odd data locations to the fourth non-volatile storage array using the second multi-channel memory controller;
   wherein the first and second multi-channel memory controllers and the first through fourth non-volatile storage arrays are adapted on a single semiconductor die.

10. The method of claim 9, further comprising implementing a redundant array of inexpensive or independent disks (RAID) functionality so that the first through fourth non-volatile storage arrays appear as a single storage element.

11. The method of claim 10, further comprising using driver level software in the host system to implement the RAID functionality so that application software in the host system sees the first through fourth non-volatile storage arrays as the single storage element.

12. The method of claim 10 including using the hub to divide available bandwidth of a USB bus, coupled to the USB port, between the first and second controllers.

13. The method of claim 9, further comprising implementing a redundant array of inexpensive or independent disks (RAID) functionality in the host system so that the portable mass storage device appears to the host system as a plurality of devices coupled to the USB bus.

14. The method of claim 9, wherein the data corresponds to video content, the host system is of a video rental service, and the portable mass storage device is of a user of the video rental service.

15. The method of claim 9, further comprising receiving 6 GB of the data in less than approximately 3 minutes.

* * * * *